US009858116B2

(12) United States Patent
Cho et al.

(10) Patent No.: US 9,858,116 B2
(45) Date of Patent: Jan. 2, 2018

(54) FUNCTIONAL UNIT FOR SUPPORTING MULTITHREADING, PROCESSOR COMPRISING THE SAME, AND OPERATING METHOD THEREOF

(71) Applicant: SAMSUNG ELECTRONICS CO., LTD., Suwon-si (KR)

(72) Inventors: Yeon-Gon Cho, Hwaseong-si (KR); Soo-jung Ryu, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 104 days.

(21) Appl. No.: 14/542,827

(22) Filed: Nov. 17, 2014

(65) Prior Publication Data
US 2015/0178132 A1 Jun. 25, 2015

(30) Foreign Application Priority Data
Dec. 20, 2013 (KR) ........................ 10-2013-0160231

(51) Int. Cl.
*G06F 9/46* (2006.01)
*G06F 9/48* (2006.01)
*G06F 9/38* (2006.01)

(52) U.S. Cl.
CPC .......... *G06F 9/4881* (2013.01); *G06F 9/3851* (2013.01); *G06F 9/3891* (2013.01); *G06F 9/466* (2013.01)

(58) Field of Classification Search
CPC ...... G06F 9/3851; G06F 9/3891; G06F 9/466; G06F 9/4881

(Continued)

(56) References Cited

U.S. PATENT DOCUMENTS

| 7,207,040 B2 * | 4/2007 | Boudnik | G06F 9/465 709/201 |
| 8,302,098 B2 * | 10/2012 | Johnson | G06F 9/5088 713/300 |

(Continued)

FOREIGN PATENT DOCUMENTS

| EP | 1148414 A2 | 10/2001 |
| WO | 94/27216 A1 | 11/1994 |

(Continued)

OTHER PUBLICATIONS

Communication dated Jul. 14, 2016, issued by the European Patent Office in counterpart European Patent Application No. 14197626.6.

(Continued)

*Primary Examiner* — Marina Lee
(74) *Attorney, Agent, or Firm* — Sughrue Mion, PLLC (57) ABSTRACT

A functional unit for supporting multithreading, a processor including the same, and an operating method of the processor are provided. The functional unit for supporting multithreading includes a plurality of input ports configured to receive opcodes and operands for a plurality of threads, wherein each of the plurality of input ports is configured to receive an opcode and an operand for a different thread, a plurality of operators configured to perform operations using the received operands, an operator selector configured to select, based on each opcode, an operator from among the plurality of operators to perform a specific operation using an operand from among the received operands, and a plurality of output ports configured to output operation results of operations for each thread.

18 Claims, 7 Drawing Sheets (58) Field of Classification Search
USPC .......................................................... 718/101
See application file for complete search history.

(56) References Cited

U.S. PATENT DOCUMENTS

| | | | | |
|---|---|---|---|---|
| 8,332,854 B2* | 12/2012 | Kinsey | .................. | G06F 9/4881 |
| | | | | 718/100 |
| 8,538,730 B1* | 9/2013 | Becker | ................ | G06F 11/3409 |
| | | | | 702/183 |
| 8,631,415 B1* | 1/2014 | Nadathur | .............. | G06F 9/5088 |
| | | | | 712/10 |
| 8,719,828 B2* | 5/2014 | Lewis | .................. | G06F 9/4843 |
| | | | | 718/101 |
| 2004/0034856 A1* | 2/2004 | Boudnik | ................ | G06F 9/465 |
| | | | | 718/103 |
| 2004/0216102 A1* | 10/2004 | Floyd | .................... | G06F 9/3009 |
| | | | | 718/100 |
| 2005/0210471 A1* | 9/2005 | Okawara | ............... | G06F 9/4881 |
| | | | | 718/100 |
| 2006/0136915 A1* | 6/2006 | Aingaran | .............. | G06F 9/3842 |
| | | | | 718/100 |
| 2006/0190703 A1* | 8/2006 | Carrie | .................... | G06F 9/3836 |
| | | | | 712/214 |
| 2006/0242642 A1* | 10/2006 | Yamamura | ............ | G06F 9/4881 |
| | | | | 718/100 |
| 2009/0138890 A1* | 5/2009 | Blake | ........................ | G06F 9/466 |
| | | | | 718/106 |
| 2009/0187915 A1* | 7/2009 | Chew | .................... | G06F 9/5044 |
| | | | | 718/104 |
| 2010/0083266 A1* | 4/2010 | Dai | ......................... | G06F 9/526 |
| | | | | 718/103 |
| 2011/0016470 A1* | 1/2011 | Cain, III | ................. | G06F 9/528 |
| | | | | 718/101 |
| 2011/0055838 A1* | 3/2011 | Moyes | .................. | G06F 9/4881 |
| | | | | 718/102 |
| 2011/0126200 A1 | 5/2011 | Krieger et al. | | |
| 2013/0097607 A1* | 4/2013 | Lewis | .................... | G06F 9/4843 |
| | | | | 718/102 |
| 2013/0125131 A1* | 5/2013 | Yamashita | ................ | G06F 9/52 |
| | | | | 718/104 |
| 2014/0189329 A1 | 7/2014 | Luiz et al. | | |
| 2015/0135182 A1* | 5/2015 | Liland | .................... | G06F 9/3867 |
| | | | | 718/102 |
| 2015/0135183 A1* | 5/2015 | Kipp | ......................... | G06F 9/46 |
| | | | | 718/103 |
| 2015/0178132 A1* | 6/2015 | Cho | ....................... | G06F 9/3851 |
| | | | | 718/101 |

FOREIGN PATENT DOCUMENTS

| | | |
|---|---|---|
| WO | 2007/027671 A2 | 3/2007 |
| WO | 2010/142987 A1 | 12/2010 |

OTHER PUBLICATIONS

Communication dated Jan. 16, 2017, issued by the European Patent Office in counterpart European Patent Application No. 14197626.6.
Stephen W. Keckler et al; "Processor Coupling: Integrating Compile Time and Runtime Scheduling for Parallelism"; Proceedings of the Annual International Symposium on Computer Architecture; May 19, 1992; pp. 202-213; 14 pgs. total.

* cited by examiner

FUNCTIONAL UNIT FOR SUPPORTING MULTITHREADING, PROCESSOR COMPRISING THE SAME, AND OPERATING METHOD THEREOF

CROSS-REFERENCE TO RELATED APPLICATION

This application claims priority from Korean Patent Application No. 10-2013-0160231, filed on Dec. 20, 2013 in the Korean Intellectual Property Office, the disclosure of which is incorporated herein by reference in its entirety.

BACKGROUND

1. Technical Field

Apparatuses and methods consistent with exemplary embodiments relate to a multithreading processor, and more particularly to a functional unit for supporting multithreading, a processor including the same, and an operating method thereof.

2. Description of the Related Art

With the development of computer technologies, there are frequent cases where not only one task, but also multiple tasks, are to be executed at the same time. Such simultaneous execution of multiple tasks may be accomplished by multiprocessing, multitasking, multiprogramming, and/or multithreading.

Multiprocessing is performed by multitasking, or multiplexing, or the like, in which multitasking may refer to processing multiple tasks in multiple processors (or threads), and multiplexing may refer to processing multiple tasks in one processor.

For example, when multitasking multiple operations (i.e. tasks) at the same time, an operating system (OS) may use a method of executing by using multiple processors (multi-processes), or executing multiple threads (multi-threads).

The multi-processes and the multi-threads may have in common a feature of simultaneous multiple flows of tasks. However, there are differences between the multi-processes and the multi-threads in that in the multi-processes, processes are executed independently from each other, and each has its own memory, while the multi-threads share memories in one process; a speed of conversion between threads is faster than a speed of conversion between processes; and scheduling of threads is also performed faster than scheduling of processes.

SUMMARY

According to an aspect of an exemplary embodiment, there is provided a functional unit for supporting multithreading, the functional unit including a plurality of input ports configured to receive opcodes and operands for a plurality of threads, wherein each of the plurality of input ports is configured to receive an opcode and an operand for a different thread, a plurality of operators configured to perform operations using the received operands, an operator selector configured to select, based on each opcode, an operator from among the plurality of operators to perform a specific operation using an operand from among the received operands, and a plurality of output ports configured to output operation results of operations for each thread.

Each of the plurality of output ports may be configured to output operation results for a different thread.

The plurality of operators may include a plurality of registers configured to be assigned to each thread along a datapath to store the operation results of operations.

Each of the plurality of operators may be configured to perform a specific operation different from operations performed by other operators of the plurality of operators.

At least two operators of the plurality of operators may be configured to perform an identical operation.

The at least two operators may be configured to perform a frequently performed operation in the functional unit.

The at least two operators may be configured to generate a signal that indicates a current status, and transmit the generated signal to the operator selector.

According to an aspect of another exemplary embodiment, there is provided a processor including a processing element configured to include at least one functional unit to process a plurality of threads at a same time, a resource conflict detector configured to detect a resource conflict by determining whether at least the threads of the plurality of threads simultaneously attempt to perform an identical operation in an identical functional unit, and a resource scheduler configured to determine a processing order of the conflicting at least two threads according to predetermined criteria in response to the resource conflict being detected.

The resource conflict detector may include a resource information storage configured to store operator information about the at least one functional unit, an opcode comparator configured to compare opcodes of the plurality of threads in each of the at least one functional unit, and a resource conflict determiner configured to determine the resource conflict based on results of the comparison by the opcode comparator and the operator information stored by the resource information storage.

The operator information may include at least one piece of information from among types of operators, a number of operators, and status information of each operator.

The resource scheduler may be further configured to generate a stall signal for threads having a low priority from among the conflicting at least two threads.

The processor may further include a queue configured to store resource conflict detection results received from the resource conflict detector.

The processor may further include a flush configured to flush the queue in response to the resource conflict detection results stored in the queue being invalid due to execution of control statements included in some of the plurality of threads.

According to an aspect of another exemplary embodiment, there is provided a method of operating a processor that includes at least one functional unit configured to process a plurality of threads at a same time, the method including detecting a resource conflict by determining whether at least two threads simultaneously attempt to perform an identical operation in an identical functional unit, and determining a processing order of the conflicting at least two threads according to predetermined criteria in response to the resource conflict being detected.

The detecting the resource conflict may include comparing opcodes of the plurality of threads for each of at least the one functional unit, and determining the resource conflict based on a result of the comparing and stored operator information.

The operator information may include at least one piece of information from among types of operators, a number of operators, and a current status of each operator.

The method may further include stalling threads having a low priority from among the conflicting at least two threads.

The method may further include storing, in a queue, resource conflict detection results.

The method may further include flushing the queue in response to the resource conflict detection results stored in the queue being invalid due to execution of control statements included in some of the plurality of threads.

BRIEF DESCRIPTION OF THE DRAWINGS

The above and/or other aspects will become apparent and more readily appreciated from the following description of exemplary embodiments, taken in conjunction with the accompanying drawings of which.

DETAILED DESCRIPTION OF EXEMPLARY EMBODIMENTS

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Throughout the drawings and the detailed description, unless otherwise described, the same drawing reference numerals will be understood to refer to the same elements, features, and structures. The relative size and depiction of these elements may be exaggerated for clarity, illustration, and convenience.

Hereinafter, the exemplary embodiments will be described in detail with reference to the accompanying drawings.

According to one or more exemplary embodiments, a person of ordinary skill in the art will appreciate that a functional unit, which may also be called an execution unit, may be part of a central processing unit (CPU) or processor and may perform the operations and calculations called for by a computer program that is being run or preparing to run on the CPU. The functional unit may have its own internal control sequence unit, which may also be called an operator selector, which is separate from a CPUs main control unit. The functional unit may also have one or more registers, and other internal units such as a sub-Arithmetic Logic Unit (ALU) or a floating-point unit (FPU), and/or some other smaller components. According to one or more exemplary embodiments, a CPU may have multiple parallel functional units when arranged in a scalar or superscalar design. Further, a CPUs' functional units may be pipelined and/or a CPUs' functional units may be arranged such that one functional unit is used as a bus manager to manage the memory interface and the other functional units are configured to perform calculations for the computer program being run by the CPU.

Figure 1:
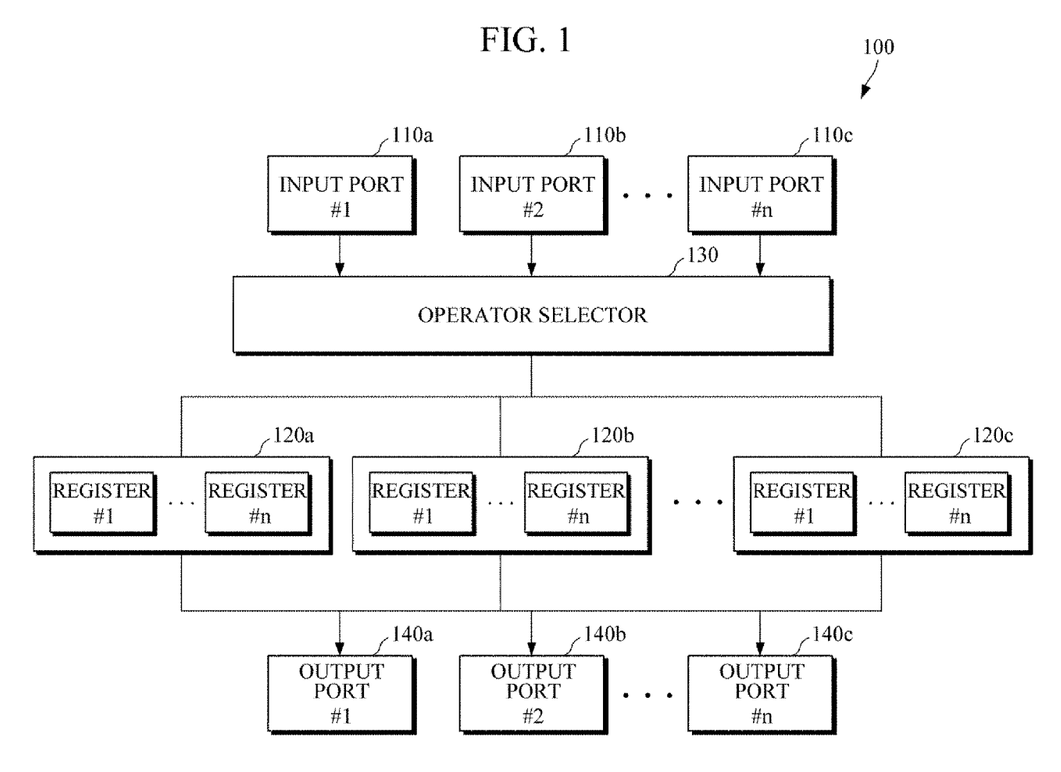
FIG. 1 is a block diagram schematically illustrating a functional unit for supporting multithreading according to an exemplary embodiment.

FIG. 1 is a block diagram schematically illustrating a functional unit for supporting multithreading according to an exemplary embodiment.

Referring to FIG. 1, a functional unit (FU) 100 may include input ports 110a, 110b, and 110c, operators 120a, 120b, and 120c, an operator selector 130, and output ports 140a, 140b, and 140c.

The input ports 110a, 110b, and 110c may receive opcodes and operands for each thread. For example, input port #1 110a receives an opcode and operand for thread 1, input port #2 110b receives an opcode and operand for thread 2, and input port #n 110c receives an opcode and operand for thread n, in which a number of input ports may be the same as a number of threads to be executed simultaneously, but is not limited thereto.

The operators 120a, 120b, and 120c may perform specific operations for operands. The operator may be implemented as an adder, a multiplier, a divider, a comparator, or the like, but is not limited thereto.

According to an exemplary embodiment, registers #1 and #n that are assigned to each thread and store operation results may be included along a datapath of each of the operators 120a, 120b, and 120c for multithreading, in which register #1 may be assigned to thread 1, and register #n may be assigned to thread n.

The operator selector 130 may select operators to perform operations for each operand based on opcodes received from each of the input ports 110a, 110b, and 110c. For example, with an assumption that the operator 120a is an adder, the operator 120b is a multiplier, and the operator 120c is a comparator, if an opcode for thread 1 is an add instruction, and an opcode for thread 2 is a multiply instruction, the operator selector 130 may select the operator 120a as an operator to process an operand for thread 1, and may select the operator 120b as an operator to process an operand for thread 2. In this case, the operator 120a performs an add operation for an operand of thread 1, and at the same time, the operator 120b performs a multiply operation for an operand of thread 2.

The output ports 140a, 140b, and 140c may output operation results for each thread. For example, output port #1 140a may output an operation result for thread 1, output port #2 140b may output an operation result for thread 2, and output port #n 140c may output an operation result for thread n, in which a number of output ports may be the same as a number of threads to be processed at the same time, but is not limited thereto.

As described above, the functional unit 100 may process a plurality of threads at the same time, thereby maximizing thread level parallelism (TLP).

According to an exemplary embodiment, the operators 120a, 120b, and 120c may be configured to perform operations different from each other. In this case, the functional unit 100 may process different opcodes for a plurality of threads at the same time.

However, in a case where the operators 120a, 120b, and 120c are configured to perform operations different from each other, and two or more threads are configured to perform an identical operation using the same functional unit 100, a resource conflict occurs, and threads of a low priority are stalled, such that system performance may be reduced.

In order to address the stalled threads and reduction in performance, according to an exemplary embodiment, two or more operators from among the operators 120a, 120b, and 120c may be configured to perform an identical operation. Particularly, in order to perform a frequently performed operation in the functional unit 100 without a resource conflict, more than one frequently used operators may be arranged in the functional unit 100. In order to know many when and home many operators to arrange, various thread operations may be profiled in advance to determine and profile which operations are frequently performed. Accordingly, based on the profiled operations the functional unit may arrange a plurality of frequently used operators. For example, upon profiling, if threads frequently performing an add operation cause resource conflicts frequently, reducing system performance, an operator that functions as an adder may be further added to the functional unit 100, and each adder generates a signal to indicate information on its own current status, i.e. information as to whether each adder is in a condition to be used. Accordingly, the signal is transmitted to the operator selector 130 to enable the operator selector 130 to make an appropriate selection based on availability.

Specifically, according to an exemplary embodiment, each of the two or more operators configured to perform an identical operation may generate a signal to indicate its own current status, and may output the signal to the operator selector 130. The signal that indicates a current status refers to a signal that indicates whether each operator may be used. For example, when each of the two or more operators is performing operations, and thus may not perform operations for other threads, each operator may generate a busy signal to transmit the generated signal to the operator selector 130. In this case, the operator selector 130 selects an operator from among other operators, excluding the operator that transmitted the busy signal.

Further, upon completing an operation that was being performed when the busy signal was transmitted, the operator that transmitted the busy signal to the operator selector 130 may generate and output a completion signal so that another thread may use the operator.

Figure 2:
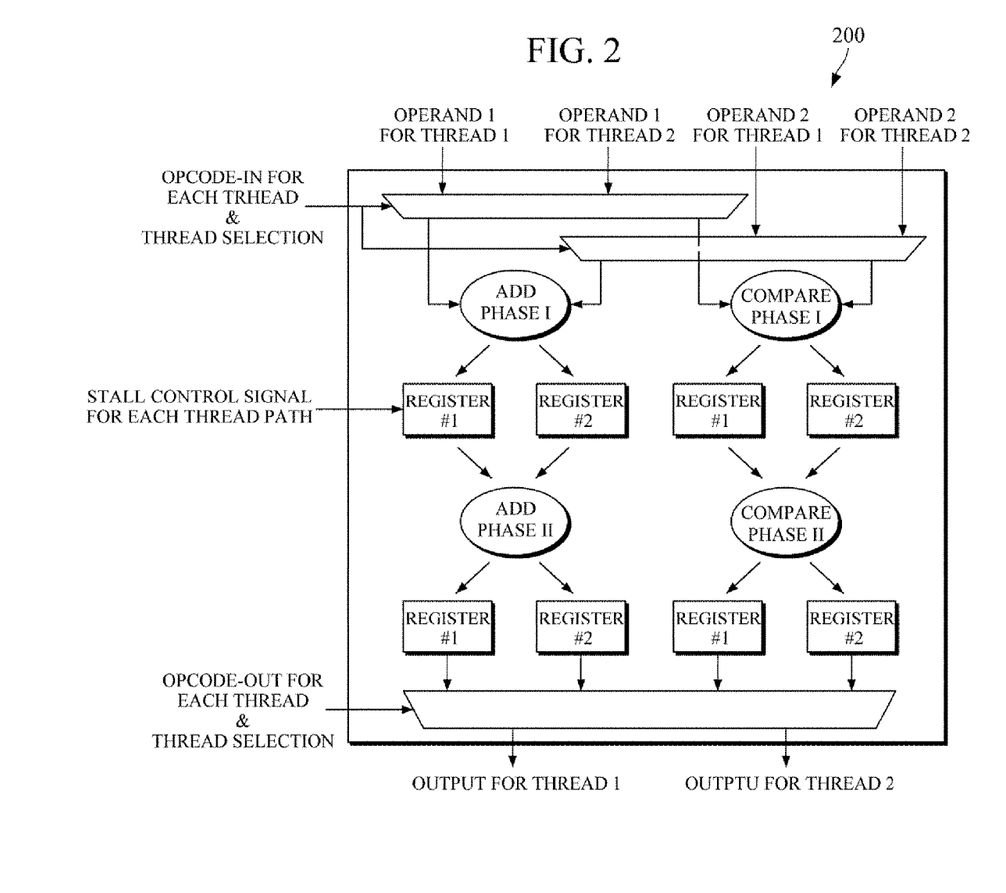
FIG. 2 is a block diagram illustrating an example of a functional unit for supporting multithreading according to an exemplary embodiment.

FIG. 2 is a block diagram illustrating an example of a functional unit for supporting multithreading according to an exemplary embodiment. The functional unit 200 in FIG. 2, which is an example of a functional unit for processing two threads at the same time, includes two operators (adder and comparator). For convenience, FIG. 2 illustrates a functional unit that includes two operators, but a functional unit may also include various operators according to use and performance of an invention.

Referring to FIG. 2, the functional unit 200 receives operands and opcodes for threads 1 and 2. The functional unit 200 selects operators to perform operations for operands of each thread, and operators selected for each thread are used to perform operations for operands of each thread. For example, if an opcode of thread 1 is an add instruction and an opcode of thread 2 is a compare instruction, the functional unit 200 uses an adder to perform an add operation for operands of thread 1, and at the same time, uses a comparator to perform a compare operation for operands of thread 2.

Registers for each thread are included along a datapath of each operator. For example, register #1 is a register for thread 1, and register #2 is a register for thread 2. That is, an operation result of an operand for thread 1 is stored in register #1, and an operation result of an operand for thread 2 is stored in register #2.

Then, the functional unit 200 outputs operation results for every thread through two output terminals.

Figure 3:
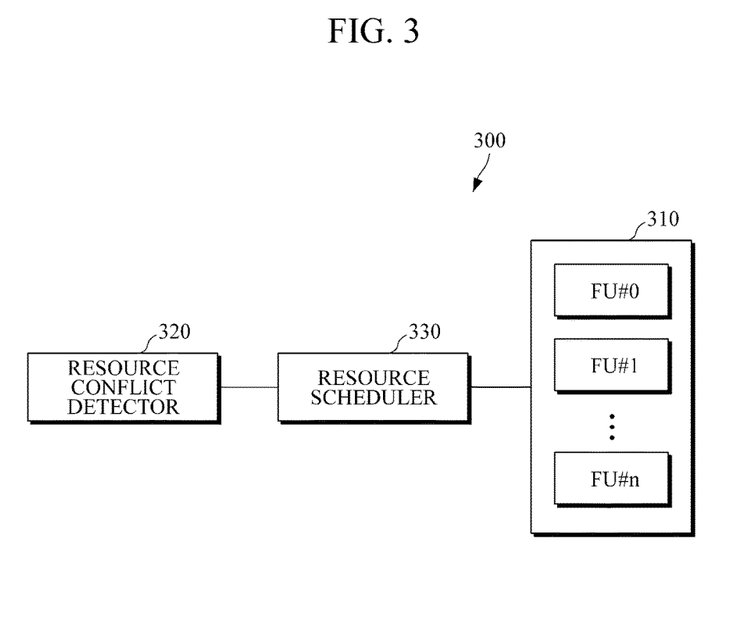
FIG. 3 is a block diagram illustrating an example of a processor according to an exemplary embodiment.

FIG. 3 is a block diagram illustrating an example of a processor according to an exemplary embodiment.

Referring to FIG. 3, the processor 300 includes a processing element 310, a resource conflict detector 320, and a resource scheduler 330.

The processing element 310 may process a plurality of threads at the same time. To this end, the processing element 310 may include one or more functional units (FU #0 to FU #n). Each or at least one of the functional units may execute a plurality of operations for a plurality of threads at the same time, in a similar manner, and with a similar configuration as the functional unit described with reference to FIG. 1, and thus a detailed description thereof will be omitted.

The resource conflict detector 320 may detect whether two or more threads simultaneously execute an identical operation in an identical functional unit so as to detect a resource conflict. For example, in a case where thread 1 executes an add operation in FU #0, and thread 2 executes a multiply operation in FU #0, as FU #0 may perform an add operation and a multiply operation at the same time, a resource conflict does not occur. However, in a case where thread 1 and thread 2 equally perform a compare operation in FU #1, in which there is only one comparator to perform a compare operation, a resource conflict occurs. In this case, the resource conflict detector 320 may detect a resource conflict in FU #1.

The resource scheduler 330 may determine a processing order of conflicting threads according to predetermined criteria. For example, the resource scheduler 330 may determine a processing order of conflicting threads by directly determining whether a cache miss occurs, or by receiving external information thereon. In another example, the resource scheduler 330 may determine a processing order of conflicting threads according to an order of priority set by a user or a system, but the determination of the processing order is not limited thereto. For example, according to another exemplary embodiment, when no cache miss is detected, no external information is provided, and no thread priority difference exists among the conflicting threads, the resource schedule 330 may determine a processing order based on particular properties of the threads and how they compare to the other conflicting threads and then organizing the conflicting threads accordingly. For example, the particular properties may include values such as a processing time for the thread, a storing time, an amount of time to call up information from memory requested by the thread, operation complexity and cycles, and other known values. Further, according to another exemplary embodiment, these values may be used in a weighted decision algorithm that takes into account all the received and determined information relating to the conflicting threads.

The resource scheduler 330 may generate a stall signal to stall datapaths of threads of a low priority based on a determined processing order. Further, the resource scheduler 330 may generate a grant signal if permission is granted to use resource of a stalled thread.

After receiving a stall signal, the processing element 310 stalls datapath of threads of a low priority, and after receiving a grant signal generated in response to permission to use resource of a stalled thread being granted, the stalled thread is unstalled, and processing of the thread is resumed.

Figure 4:
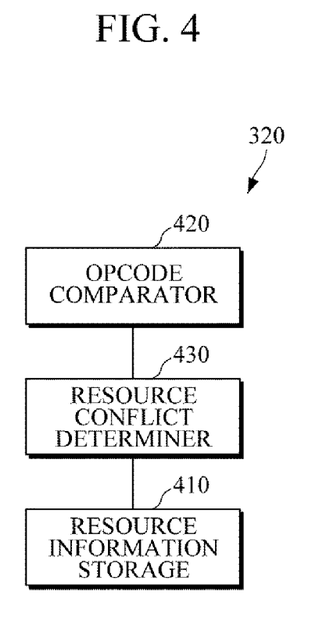
FIG. 4 is a detailed diagram illustrating an example of a resource conflict detector in FIG. 3, according to an exemplary embodiment.

FIG. 4 is a detailed diagram illustrating an example of a resource conflict detector in FIG. 3 according to an exemplary embodiment.

Referring to FIG. 4, the resource conflict detector 320 includes a resource information storage 410, an opcode comparator 420, and a resource conflict determiner 430.

The resource information storage 410 stores thread information, functional unit information, operation information, and the like, as a resource table. The thread information may include identifications of threads to be processed at the same time, threads that are being processed, and the like. The functional unit information may include a number of functional units included in the processing element 310, identifications of functional units, and the like. The operator information may include types of operators, a number of operators, status information of operators, and the like, in which the status information refers to information as to whether each operator is performing an operation.

Further, in a case where two or more operators of operators 120a, 120b, and 120c included in the functional unit 100 are configured to process an identical opcode, an operator that transmitted a busy signal to the operator selector 130 transmits a completion signal in response to completion of processing an opcode, which was being processed when the busy signal was transmitted, and the resource information storage 410 receives the completion signal to update status information of the operator in the functional unit. A table of operators may be managed by various methods.

The opcode comparator 420 may compare opcodes for each thread in each functional unit. For example, by decoding instructions of each thread, types of operations to be performed in each functional unit may be identified by the opcodes. In this case, by comparing opcodes for each thread in each functional unit, the opcode comparator 420 may determine whether each functional unit performs an identical operation.

The resource conflict determiner 430 may determine a resource conflict based on information stored in the resource information storage 410, and based on comparison results by the opcode comparator 420. For example, with an assumption that threads 1 and 2 equally perform an add operation in FU #0, if two adders are included in FU #0 based on operator information of FU #0 stored in the resource information storage 410, no resource conflict occurs as FU #0 may use the two adders at the same time. However, if only one adder is included in FU #0, opcodes for threads 1 and 2 may not be processed at the same time as two add operations may not be performed at the same time with only the one adder in FU #0. In this case, the resource conflict determiner 430 may determine a resource conflict.

The processor employs a pipelining method. A software pipelining generally includes operations of fetching, decoding, executing, and writing back.

In the exemplary embodiment, the resource conflict detector 320 may detect a resource conflict by comparing opcodes for each thread in the operation of decoding instructions in the software pipelining.

Figure 5:
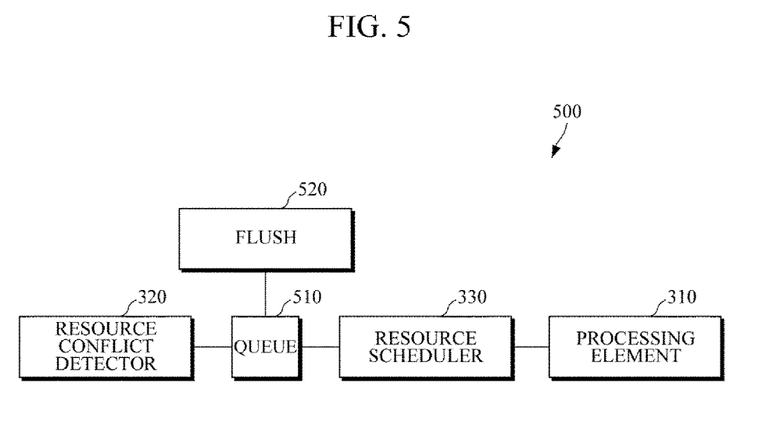
FIG. 5 is a block diagram illustrating an example of a processor according to another exemplary embodiment.

FIG. 5 is a block diagram illustrating an example of a processor according to another exemplary embodiment.

Referring to FIG. 5, the processor 500 may also include a queue 510 and a flush 520 in addition to a resource conflict detector 320, a resource scheduler 330, and a processing element 310.

In a case where control statements, such as branch and the like, are included in some threads that are processed at the same time in the processor 500, results detected by the resource conflict detector 320 in the operation of decoding of instructions may not be valid due to execution of control statements. Thus, the processor 500 may further include the queue 510 and the flush 520 in addition to the configuration of the processor 300 in FIG. 3.

The queue 510 may store detection results of the resource conflict detector 320.

The flush 520 may flush the queue 510 in a case where detection results stored in the queue 510 are not valid due to execution of control statements.

In a case where control statements are not included in threads, or in a case where detection results stored in the queue 510 are valid even when control statements are executed, the queue 510 transmits detection results to the resource scheduler 330, and the resource scheduler 330 may stall a datapath of conflicting threads based on the detection results. In this case, threads may be stalled based on a processing order determined according to criteria preset by the resource scheduler 330.

Figure 6:
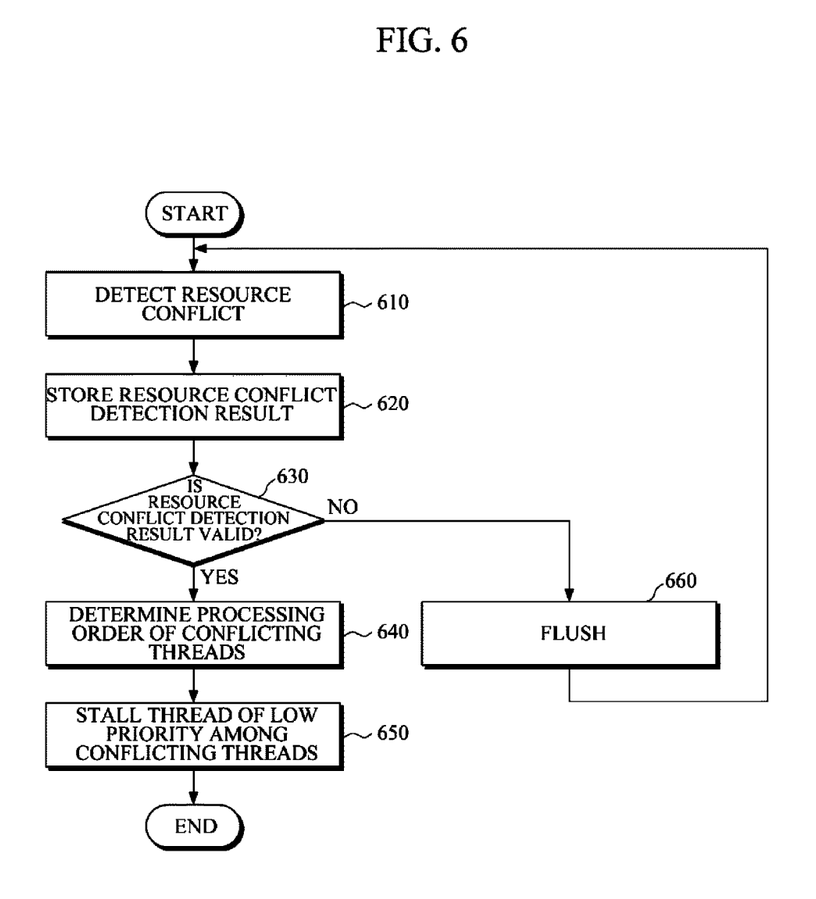
FIG. 6 is a flowchart illustrating an example method of operating a processor according to an exemplary embodiment.

FIG. 6 is a flowchart illustrating an example method of operating a processor according to an exemplary embodiment.

Referring to FIG. 6, the method for operating a processor includes checking whether a plurality of threads perform an identical operation in an identical functional unit at the same time to detect a resource conflict (operation 610).

Then, resource conflict detection results are stored in the queue 510 (operation 620).

Subsequently, upon executing control statements included in some of a plurality of threads, it is determined whether detection results stored in the queue 510 are valid (operation 630).

In response to a determination that the detection results stored in the queue 510 are valid (operation 630—YES), a processing order of conflicting threads is determined according to predetermined criteria (operation 640), and then threads of a low priority among the conflicting threads are stalled (operation 650).

In response to a determination that the detection results stored in the queue 510 are not valid (operation 630—NO), the queue 510 is flushed (operation 660), and then returns to operation 610.

Figure 7:
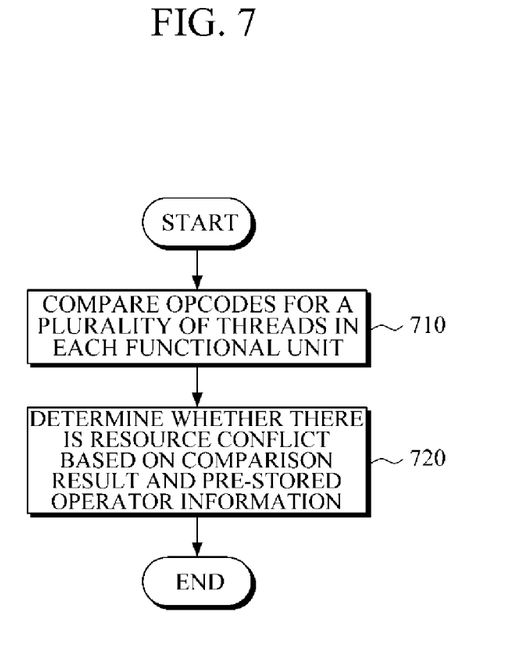
FIG. 7 is a detailed flowchart illustrating an example of detecting a resource conflict in FIG. 6, according to an exemplary embodiment.

FIG. 7 is a detailed flowchart illustrating an example of detecting a resource conflict (operation 610) in FIG. 6.

Referring to FIG. 7, the detecting of the resource conflict includes comparing opcodes for a plurality of threads to be processed at the same time in each functional unit (operation 710). For example, by decoding instructions of each thread, types of operations to be performed in each functional unit may be identified by the opcodes. Thus, by comparing opcodes for each thread in each functional unit in the operation of decoding instructions in the instruction pipeline, it may be determined whether each functional unit performs an identical operation at the same time.

Thereafter, it is determined whether there are resource conflicts (operation 720) based on comparison results and pre-stored operator information, in which the operator information may include types of operators and a number of operators included in each functional unit, and status information of each operator.

The methods and/or operations described above may be recorded, stored, or fixed in one or more non-transitory computer-readable storage media that includes program instructions to be executed by a computer or a processor to execute or perform the program instructions. The media may also include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A functional unit for supporting multithreading, the functional unit comprising:
    a plurality of input ports configured to receive opcodes and operands for a plurality of threads, wherein each of the plurality of input ports is configured to receive an opcode and an operand for a different thread;
    a plurality of operators configured to perform operations using the operands;
    an operator selector configured to select, based on each of the opcodes, an operator from among the plurality of operators to perform a specific operation using one of the operands;
    a plurality of output ports configured to output operation results of operations for each of the plurality of threads;
    a resource conflict detector configured to detect a resource conflict by determining whether at least two threads of the plurality of threads simultaneously attempt to perform an identical operation based on a comparison of the opcodes of the plurality of threads, performed in a decoding operation; and
    a resource scheduler configured to determine a processing order of the at least two threads by stalling one thread of the at least two threads that is determined to have a lower priority,
    wherein each of the plurality of operators is implemented as an arithmetic logical operator, and the arithmetic logical operator comprises at least one from among an adder, a multiplier, a divider, and a comparator, and
    wherein each of the plurality of operators is configured to perform a specific arithmetic logical operation different from arithmetic logical operations performed by other operators of the plurality of operators.

2. The functional unit of claim 1, wherein each of the plurality of output ports is configured to output operation results for different threads.

3. The functional unit of claim 1, wherein the plurality of operators comprise a plurality of registers configured to be assigned to each of the plurality of threads along a datapath to store the operation results of operations.

4. The functional unit of claim 1, wherein the operators are configured to perform a frequently performed operation in the functional unit.

5. The functional unit of claim 1, wherein the operators are configured to generate a signal that indicates a current status, and transmit the signal to the operator selector.

6. A processor comprising:
    a processing element configured to include at least one functional unit to process a plurality of threads at a same time;
    a resource conflict detector configured to detect a resource conflict by determining whether at least two threads of the plurality of threads simultaneously attempt to perform an identical operation in an identical functional unit based on a comparison of opcodes of the plurality of threads, performed in a decoding operation; and
    a resource scheduler configured to determine a processing order of the at least two threads according to predetermined criteria in response to the resource conflict being detected, and generate a stall signal for the threads having a low priority from among the at least two threads, wherein the at least one functional unit comprises a plurality of operators configured to perform operations using operands received from the plurality of threads,
    wherein each of the plurality of operators is implemented as an arithmetic logical operator, and the arithmetic logical operator comprises at least one from among an adder, a multiplier, a divider and a comparator, and
    wherein each of the plurality of operators is configured to perform a specific arithmetic logical operation different from arithmetic logical operations performed by other operators of the plurality of operators.

7. The processor of claim 6, wherein the resource conflict detector comprises:
    a resource information storage configured to store operator information about the at least one functional unit;
    an opcode comparator configured to perform the comparison of the opcodes of the plurality of threads in each of the at least one functional unit; and
    a resource conflict determiner configured to determine the resource conflict based on results of the comparison by the opcode comparator and the operator information stored by the resource information storage.

8. The processor of claim 7, wherein the operator information comprises at least one piece of information from among types of operators, a number of operators, and status information of each operator.

9. The processor of claim 6, further comprising a queue configured to store resource conflict detection results received from the resource conflict detector.

10. The processor of claim 9, further comprising a flush configured to flush the queue in response to the resource conflict detection results stored in the queue being invalid due to execution of control statements included in some of the plurality of threads.

11. A method of operating a processor that comprises at least one functional unit for processing a plurality of threads at a same time, each thread attempting to perform an operation, the method comprising:
    detecting a resource conflict by determining whether at least two threads simultaneously attempt to perform an identical operation in an identical functional unit based on a comparison of opcodes of the plurality of threads, performed in a decoding operation;

determining a processing order of the at least two threads according to predetermined criteria in response to the resource conflict being detected; and stalling threads having a low priority from among the at least two threads, wherein the operation is implemented as an arithmetic logical operation, and the arithmetic logical operation comprises at least one from among an add operation, a multiplier operation, a divider operation and a comparative operation.

12. The method of claim 11, wherein the detecting the resource conflict comprises:

comparing the opcodes of the plurality of threads, performed in the decoding operation, for each of the at least one functional unit; and determining the resource conflict based on a result of the comparing and stored operator information.

13. The method of claim 12, wherein the operator information comprises at least one piece of information from among types of operators, a number of operators, and a current status of each operator.

14. The method of claim 11, further comprising storing, in a queue, resource conflict detection results.

15. The method of claim 14, further comprising flushing the queue in response to the resource conflict detection results stored in the queue being invalid due to execution of control statements included in some of the plurality of threads.

16. A processor comprising:
a functional unit comprising:
a first operator configured to perform a first operation and generate and transmit a first current status signal;
a second operator configured to perform a second operation and generate and transmit a second current status signal; and
an operator selector configured to select one of the first operator and the second operator based the first current status signal, the second current status signal, and a first opcode using a first operand of a first thread, and select one of the first operator and the second operator based on the first current status signal, the second current status signal, and a second opcode using a second operand of a second thread;

a resource conflict detector configured to detect a resource conflict by determining whether the first thread and the second thread simultaneously attempt to perform an identical operation based on a comparison of the first opcode and the second opcode, performed in a decoding operation; and a resource scheduler configured to determine a processing order of the first thread and the second thread by stalling one of the first thread and the second thread that is determined to have a lower priority, wherein the first operator and the second operator are implemented as arithmetic logical operators, and the arithmetic logical operators comprise at least one from among an adder, a multiplier, a divider and a comparator, and wherein the first operator and the second operator are configured to perform a different arithmetic logical operation from each other.

17. The processor of claim 16, wherein the resource conflict detector comprises:

a resource information storage configured to store operator information about the functional unit, wherein the operator information includes at least one of operator type, number of operators, and status information of each operator;

an opcode comparator configured to perform the comparison of the first opcode and the second opcode; and a resource conflict determiner configured to determine the resource conflict based on results of the comparison by the opcode comparator and the operator information.

18. The processor of claim 16, further comprising:
a queue configured to store resource conflict detection results received from the resource conflict detector; and
a flush configured to flush the queue in response to the resource conflict detection results stored in the queue being invalid due to execution of control statements included in at least one of the first thread and the second thread.

* * * * *